United States Patent

(12) United States Patent
Edge

(10) Patent No.: US 9,507,027 B2
(45) Date of Patent: Nov. 29, 2016

(54) DETERMINING LOCATION OF A TARGET DEVICE BASED ON RELATIVE CHANGE IN LOCATION INFORMATION

(75) Inventor: Stephen William Edge, Escondido, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 289 days.

(21) Appl. No.: 13/197,707

(22) Filed: Aug. 3, 2011

(65) Prior Publication Data

US 2012/0196616 A1 Aug. 2, 2012

Related U.S. Application Data

(60) Provisional application No. 61/371,587, filed on Aug. 6, 2010, provisional application No. 61/375,011, filed on Aug. 18, 2010.

(51) Int. Cl.
*H04W 4/02* (2009.01)
*G01S 19/25* (2010.01)
*G01S 5/00* (2006.01)
*G01S 19/10* (2010.01)
*H04L 29/08* (2006.01)

(52) U.S. Cl.
CPC .............. *G01S 19/25* (2013.01); *G01S 5/0036* (2013.01); *G01S 19/10* (2013.01); *H04L 67/18* (2013.01); *H04W 4/02* (2013.01)

(58) Field of Classification Search
CPC ........ G01C 21/34; G01C 21/00; H04W 4/02
USPC ...... 702/150; 703/2, 13, 22; 455/411, 456.1, 455/456.2
See application file for complete search history.

(56) References Cited

U.S. PATENT DOCUMENTS

| 6,671,620 | B1* | 12/2003 | Garin ...................... G01S 19/06 342/357.43 |
| 7,603,233 | B2 | 10/2009 | Tashiro |
| 7,711,375 | B2 | 5/2010 | Liu |
| 8,971,797 | B2 | 3/2015 | Sheynblat et al. |
| 2005/0202780 | A1* | 9/2005 | Kall .......................... H04W 8/10 455/1 |
| 2006/0136129 | A1* | 6/2006 | Yokozawa ........... G01C 21/3623 701/434 |
| 2007/0293237 | A1* | 12/2007 | Correal et al. ............... 455/456.1 |
| 2008/0076971 | A1* | 3/2008 | Clapp ........................... 600/300 |

(Continued)

FOREIGN PATENT DOCUMENTS

| JP | H09145386 A | 6/1997 |
| JP | 2004233058 A | 8/2004 |

(Continued)

OTHER PUBLICATIONS

International Search Report and Written Opinion—PCT/US2011/046666—ISA/EPO—Oct. 14, 2011.

(Continued)

*Primary Examiner* — Myron K Wyche
(74) *Attorney, Agent, or Firm* — Kilpatrick Townsend & Stockton, LLP

(57) ABSTRACT

Techniques are disclosed for determining an absolute location of a mobile device by a server. A relative change in location of a mobile device is computed using local sensors of the mobile device. The relative change in location is transmitted to a location server for estimating, by the location server, an absolute location of the mobile device.

32 Claims, 6 Drawing Sheets

(56) References Cited

U.S. PATENT DOCUMENTS

| | | | | |
|---|---|---|---|---|
| 2008/0152034 | A1* | 6/2008 | Liu | H04W 48/16 |
| | | | | 375/295 |
| 2009/0135055 | A1* | 5/2009 | Trautenberg | 342/357.02 |
| 2009/0143078 | A1 | 6/2009 | Tu et al. | |
| 2009/0217357 | A1* | 8/2009 | Dell'Uomo | H04L 63/10 |
| | | | | 726/5 |
| 2009/0315767 | A1* | 12/2009 | Scalisi | G01S 19/49 |
| | | | | 342/357.74 |
| 2010/0203902 | A1 | 8/2010 | Wachter et al. | |
| 2011/0119024 | A1* | 5/2011 | Nam et al. | 702/150 |
| 2011/0207471 | A1* | 8/2011 | Murray et al. | 455/456.1 |

FOREIGN PATENT DOCUMENTS

| | | |
|---|---|---|
| JP | 2009545241 A | 12/2009 |
| KR | 20080031077 A | 4/2008 |
| TW | 200809675 A | 2/2008 |
| WO | WO-2008011265 A2 | 1/2008 |
| WO | WO-2008016901 A2 | 2/2008 |
| WO | 2009112293 | 9/2009 |

OTHER PUBLICATIONS

Iwake F., et al.,"Recognition of vehicle's location for navigation", Vehicle Navigation and Information Systems Conference, 1989. Conferenc E Record Toronto, Ont., Canada Sep. 11-13, 1989, New York, NY, USA,IEEE, US, Sep. 11, 1989 (Sep. 11, 1989), pp. 131-138, XP010034438, DOI: 10.1109/VNIS.1989.98752 ISBN: 978-0-9692316-2-2.

Taiwan Search Report—TW100128121—TIPO—Jun. 29, 2015.
Taiwan Search Report—TW100128121—TIPO—Dec. 27, 2015.
Taiwan Search Report—TW100128121—TIPO—Apr. 29, 2016.

* cited by examiner

DETERMINING LOCATION OF A TARGET DEVICE BASED ON RELATIVE CHANGE IN LOCATION INFORMATION

CROSS-REFERENCE TO RELATED APPLICATIONS

This application claims the benefit under 35 U.S.C. §119(e) to U.S. Provisional Patent Application No. 61/371,587 entitled "Relative Change In Location," filed on Aug. 6, 2010, and U.S. Provisional Patent Application No. 61/375,011 entitled "Relative Change in Location," filed on Aug. 18, 2010, the disclosures of which are expressly incorporated by reference herein in their entireties.

BACKGROUND

Field

Aspects of the present disclosure relate, in general, to position location and, more particularly, to transmitting a relative change in location from a target device to a location server for the location server to determine the absolute location of the target device.

Background

It may be beneficial to obtain the location of a mobile device such as a wireless phone, laptop, tablet, identity tag, etc. at one or more times and to provide the location to some client application or device for the purpose of supporting some service or function. Examples of services and functions include providing navigation instructions to the user of the mobile device, tracking and/or recording the location of some valuable asset, and enabling the mobile device to obtain its own location.

To support location of mobile devices that have the capability to access wireless networks such as Global System for Mobile Communications (GSM), Code Division Multiple Access (CDMA), Wideband CDMA (WCDMA), Long Term Evolution (LTE) and WiFi and/or fixed access networks such as packet cable and DSL, a number of position methods and associated positioning protocols have been developed that rely on communication between the mobile device and a location server supported by one or more intervening fixed and/or wireless networks. One such positioning protocol developed by the 3$^{rd}$ Generation Partnership Project (3GPP) in 3GPP Technical Specification (TS) 36.355 which is publicly available is known as the LTE Positioning Protocol (LPP) and is intended to locate mobile devices that are currently accessing an LTE network.

An extension to LPP known as LPP Extensions (LPPe) is being developed by the Open Mobile Alliance (OMA) to locate mobile devices that are currently accessing an LTE network or certain other kinds of network such as GSM, WCDMA, WiFi or fixed access. The relationship of LPPe to LPP is that each LPP message is allowed to optionally include an embedded LPPe message.

The LPP, LPPe, and certain other positioning protocols, support location by having the capability to transfer assistance data from the location server to the mobile device that is being located to better enable the mobile device to make measurements of suitable signals (e.g., signals from Global Positioning System (GPS) or Global Navigation Satellite System (GNSS) satellites, signals from wireless network base stations) and, in some cases, to determine its own location from these measurements. The protocols also have the capability to allow the location server to request and later receive particular signal measurements and other location related information from the mobile device to enable the location server to calculate the location of the mobile device.

Positioning methods such as those supported by LPP and LPPe can determine a location of a target device from measurements by the target device of known external signal sources, such as GPS satellites or network base stations. In addition, measurements by network entities (e.g., base stations) of signals from the target device may also help determine the location of the target device. These measurements may enable the current absolute location of the target device to be obtained, for example its precise latitude, longitude, and altitude.

If a target device is unable to measure signals from external sources, and network entities are unable to measure enough signals from the target device, it may not be possible to obtain the location of the target device, and/or to obtain the location within a required response time or with a required accuracy. Such cases may occur when there are physical obstructions between the target device and the external signal sources and/or network entities. For example, a target device can be inside a building or tunnel, in a subway or basement, outside in a dense urban environment, or very distant from terrestrial external radio sources and network entities.

SUMMARY

In one aspect, a method of wireless communication is disclosed. The method includes computing a relative change in location of the mobile device using local sensors of the mobile device. The relative change in location is transmitted to a location server for estimating, by the location server, an absolute location of the mobile device.

Another aspect discloses an apparatus including means for computing a relative change in location of the mobile device using local sensors of the mobile device. Also included is a means for transmitting the relative change in location to a location server for estimating, by the location server, an absolute location of the mobile device.

In another aspect, a computer program product for wireless communications in a wireless network is disclosed. The computer readable medium has program code recorded thereon which, when executed by the processor(s), causes the processor(s) to perform operations of computing a relative change in location of the mobile device using local sensors of the mobile device. The program code also causes the processor(s) to transmit the relative change in location to a location server for estimating, by the location server, an absolute location of the mobile device.

Another aspect discloses wireless communication having a memory and at least one processor coupled to the memory. The processor(s) is configured to compute a relative change in location of the mobile device using local sensors of the mobile device. The processor(s) is also configured to transmit the relative change in location to a location server for estimating, by the location server, an absolute location of the mobile device.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

One aspect of the present disclosure allows for the determination of an absolute location of a target device, based on relative change in location information sent from the target device to a location server. In particular, the target device may determine its relative change in location using local sensors of the target device. The target device transmits the relative change in location to a location server which uses the received information to determine the absolute location of the mobile device. Alternatively, the target device estimates an absolute location based on a recent absolute location fix and measured relative changes in position since the last position fix. The estimated absolute location can then be transmitted to a network device, such as a location server.

Absolute location normally refers to a precise and unambiguous point, area, or volume on or near to the surface of the Earth at which or within which a target device is assumed to be located and can be described using one of several international coordinate systems—most notable latitude, longitude, and depth/altitude. Absolute location may be current location but could also refer to location in the past or future. Absolute location can also be expressed in civic terms—e.g., street address including town, state and country. Absolute location may sometimes be referred to as location, position, precise location, definite location, exact location, geographic location, or civic location, etc. Relative location refers to a point, area, or volume whose position on or near to the surface of the Earth is defined relative to another reference location. This reference location would typically be an absolute location though it could also be a relative location—relative to some other reference location. In the latter case, a sequence may occur for which the last reference location would be absolute. In addition, relative location can be obtained and used when the reference location is not known or defined—e.g. location of one person 500 meters north of another person whose absolute location is unknown. Relative location sometimes may be referred to as relative position.

Figure 1:
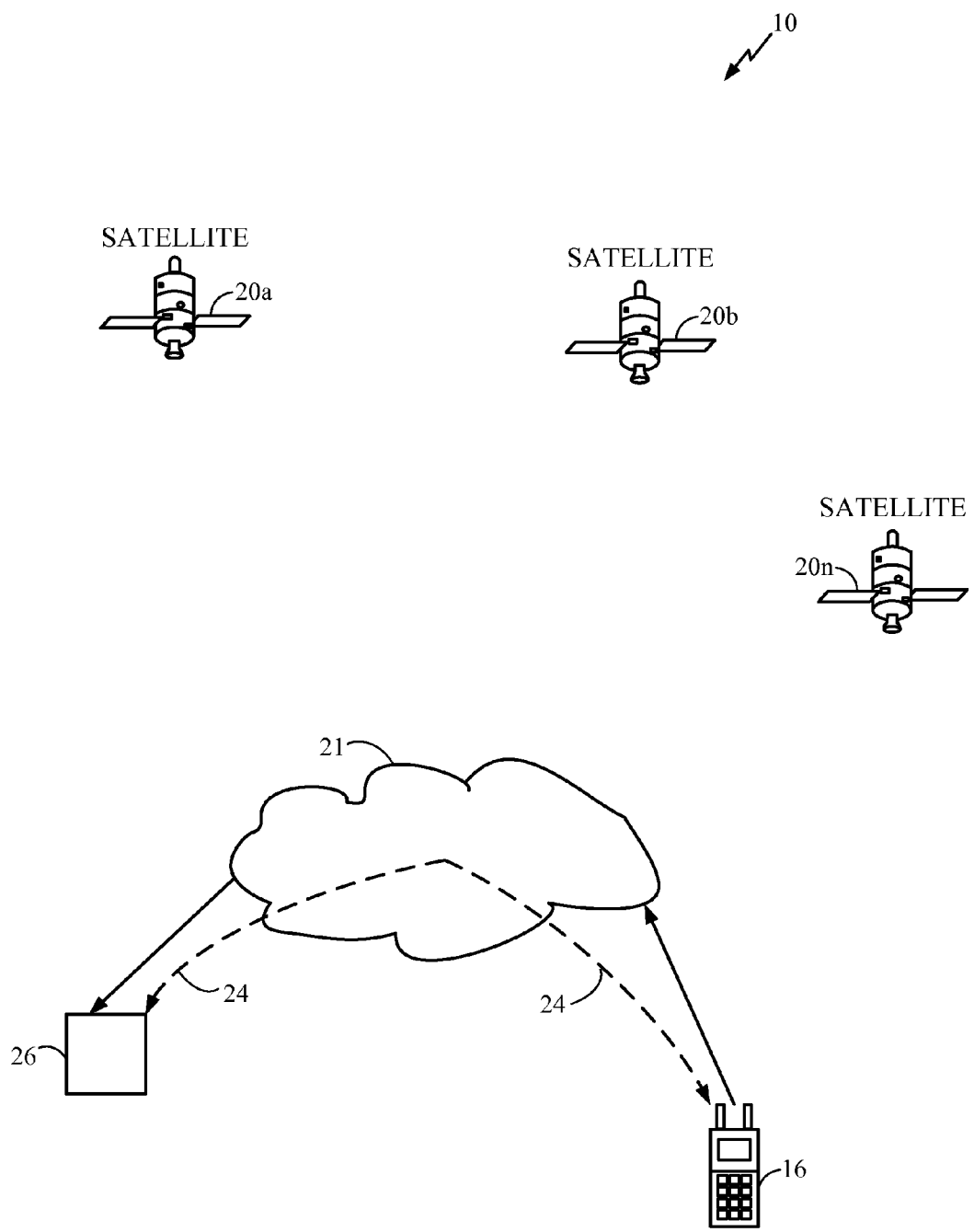
FIG. 1 is a block diagram conceptually illustrating a system in which relative change in location information may be sent to a location server from a target device.

FIG. 1 illustrates a system 10 providing for the determination of absolute location using a relative change of location. FIG. 1 includes a mobile device 16 and a location server 26. The mobile device 16 may be a wireless terminal, wireline terminal, cell phone, smartphone, laptop, tablet, etc., and may be referred to as a user equipment (UE), mobile station (MS), mobile target device, target device, or target. The location server 26 may be a 3GPP Serving Mobile Location Center (SMLC), Standalone SMLC (SAS) or a 3rd Generation Partnership Project 2 (3GPP2) Position Determining Entity (PDE) or an OMA SUPL Location Platform (SLP) supporting the OMA Secure User Plane Location (SUPL) solution or some other location server.

The mobile device 16 includes access to a network 21. The network 21 may be a wireless network, fixed network, or a combination of wireless and/or fixed networks. The location server 26 is also connected with the network 21. Connected with the location server would be some location client (not shown in FIG. 1) that might be requesting and receiving the location of the target device. In reality, the location server 26 may reside inside the network 21, be external and have communication access to the network 21, or may be inside or attached to another network (not shown) that is reachable via the network 21. GPS or GNSS satellites 20a-20n are detectable by the mobile device 16.

Position location signals may be transmitted from one or more satellites 20a-20n. The position location signals transmitted from one or more satellites 20a-20n may be received by network 21. The network 21 forwards the satellite information to the location server 26, which may transmit part or all of the satellite information as assistance data to any number of receivers, transceivers, servers, and/or terminals, including the mobile device 16 whose user may be seeking to establish a position location using satellite position system (SPS) technology included in the mobile device 16. Location related data, such as assistance data and location measurement data, may also be transmitted between the mobile device 16 and the location server 26. Transfer of assistance data (e.g. satellite information) and/or location information between the mobile device 16 and the location server 26 may employ a communication capability 24 (e.g., a connection or session) through the network 21 (and through additional networks if the location server 26 is connected to another network and not to the network 21). Communication capability 24 may make use of transport protocols like the Transmission Control Protocol (TCP) and Internet Protocol (IP) or protocols associated with and defined for the particular type (e.g. GSM, CDMA, WCDMA, LTE) of the network 21 and may employ a positioning protocol such as LPP and/or LPPe supported by the location server 26 and the mobile device 16 but not necessarily by the network 21.

Figure 2A:
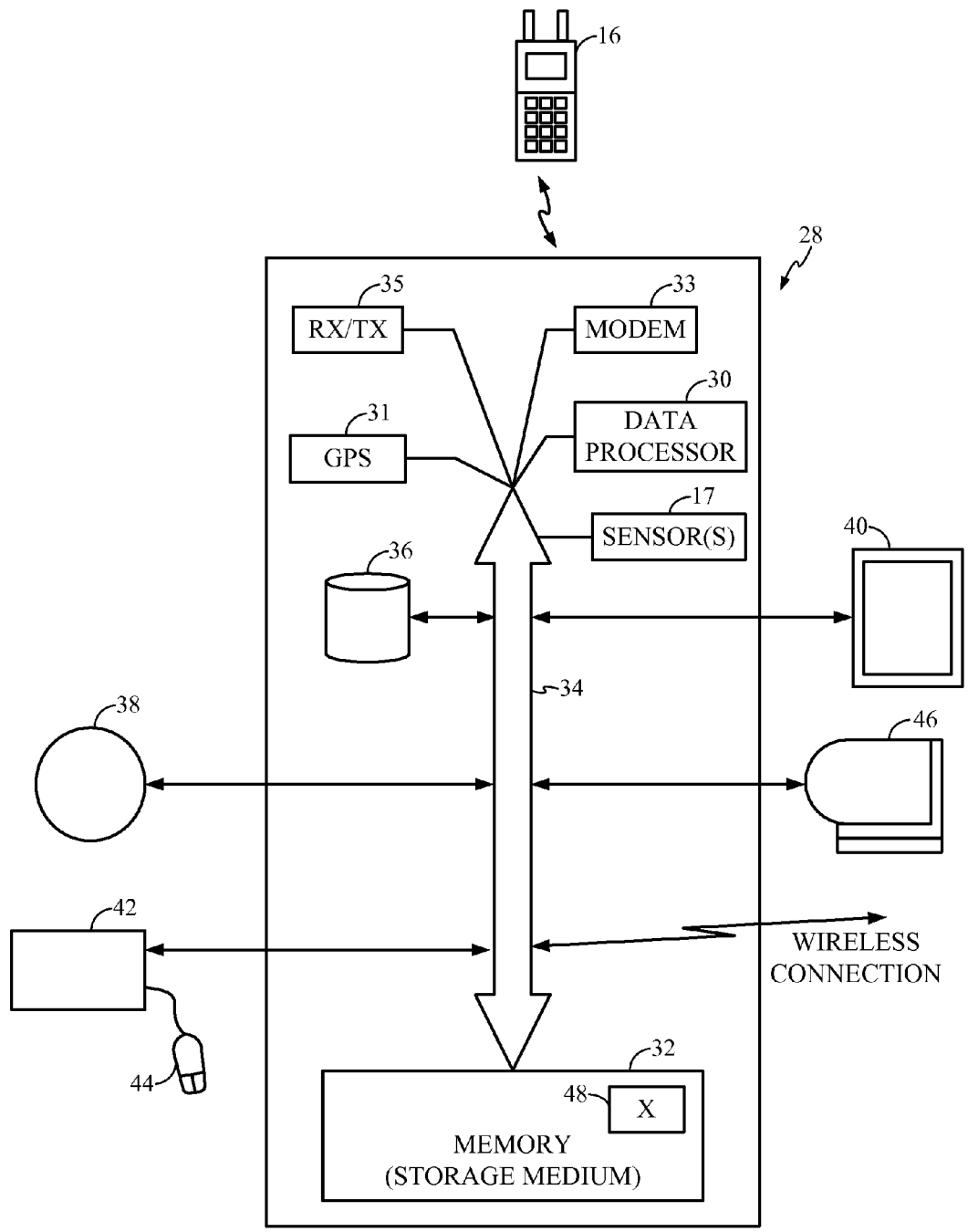
FIGS. 2A and 2B are diagrams conceptually illustrating a data processing systems that support transmitting relative change in location information from a target device to a location server.

The mobile device 16 includes one or more local sensors 17 (as illustrated in FIG. 2A). Those skilled in the art will appreciate the local sensor(s) 17 may be located within the mobile device 16 or may be communicatively attached to the mobile device 16 to work in conjunction with the mobile device. Data related to location, including a relative change in location, may be obtained from the sensor(s) 17. The sensor(s) 17 may include one or more accelerometers to measure acceleration in one or more directions, a barometer to measure changes in air pressure and altitude, a compass to measure heading, a gyroscope to measure direction of acceleration and velocity, and/or other devices for assisting in measurements. In addition, the mobile device 16 may employ other means to determine relative change in location—for example may make use of a series of photographs or video to estimate velocity or change of location or may emit radio, infra red, or audio signals and determine change in location from echoes of these signals received back by the mobile device 16. All such means of determining a relative change of location are considered herein to be a function of the sensor(s) 17.

FIG. 2A illustrates by cross-reference with FIG. 1 that the mobile device 16 includes at least one computer processing system 28. As shown, the computer processing system 28 is operatively connected to the mobile device 16. In one aspect, the computer processing system 28 is housed in the mobile device 16. The computer processing system 28 is adapted to receive, store, process, and execute instructions at least in connection with location information, including data related to relative change in location.

The computer processing system 28 of the mobile device 16 is illustrated in the block diagram of FIG. 2A. As shown, the computer processing system 28 may include a variety of components to enable the mobile device 16 to receive, process, store, and execute instructions in connection with data and information about position location data. The components may include one or more sensor(s) 17 (e.g., accelerometer, gyroscope, etc.) data processor 30, a position location receiver (e.g., a GPS receiver) 31, a storage medium 32, a wireless modem 33, and a cellular transceiver 35, all coupled by a bus 34. The storage medium 32 is a machine- or computer-readable medium and may include but is not limited to volatile memories such as DRAM, and SRAM, as well as non-volatile memories such as ROM, FLASH, EPROM, EEPROM and bubble memory.

Also capable of being connected to the bus are optional secondary storage 36, external storage 38, output devices such as a monitor 40 that may be included with the mobile device 16 and, in optional configurations, an input device such as a keyboard 42, a mouse 44, and a printer 46. The optional secondary storage 36 may include machine-readable media such as, but not limited to, a hard disk drive, a magnetic drum, and a bubble memory. The external storage 38 may include machine-readable media such as a floppy disk, a removable hard drive, a magnetic tape, CD-ROM, removable memory cards, and even other computers connected via a communications line. The distinction between the optional secondary storage 36 and the external storage 38 is primarily for convenience in describing the use of machine-readable memory. As such, a person skilled in the art will appreciate that there is substantial functional overlap between and among the components. Computer software and user programs can be stored in the storage medium 32 and/or external storage 38. Executable versions of computer software can be read from the storage medium 32 or another non-volatile storage medium, loaded for execution directly into volatile storage medium, executed directly out of non-volatile storage medium, or stored on the secondary storage prior to loading into volatile storage medium for execution.

The computer processing system 28 illustrated in FIG. 2A of the mobile device 16 includes a set of computer instructions (in this document, "instructions") 48 for implementing the methods of the location related data transfer system described in this document. The instructions 48 are illustrated in FIG. 2A diagrammatically solely as an aid in understanding the method of the location related data transfer system described in this document. The instructions may be stored in various internal memory or may be implemented in hardware. The instructions may also be included in a computer processing system of a computer located external to the mobile device 16, for example, on a secured intranet, on the Internet, or at a base station, from which they may be transmitted to the mobile device 16. Data associated with the instructions may be received, stored, processed, and transmitted to many mobile devices, but only a single mobile device 16 is illustrated for clarity.

Figure 2B:
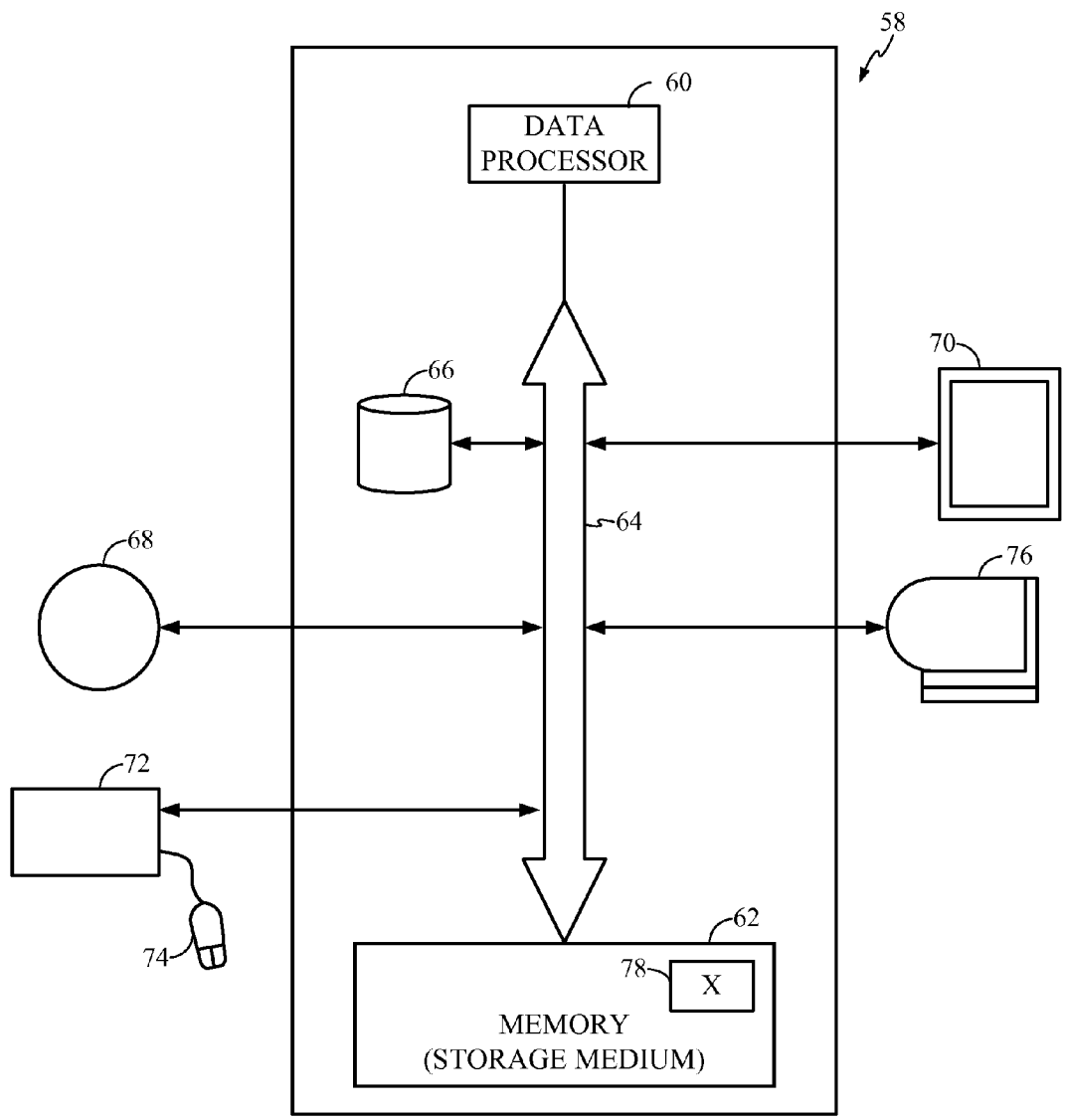

FIG. 2B illustrates, by cross-reference with FIG. 1, that the location server 26 includes at least one computer processing system 58. In one aspect, the computer processing system 58 is housed in the location server 26. The computer processing system 58 is adapted to receive, store, process, and execute instructions at least in connection with location position data.

The computer processing system 58 of the location server 26 is illustrated in the block diagram of FIG. 2B. As shown, the computer processing system 58 may include a variety of components to enable the location server 26 to receive, process, store, and execute instructions in connection with data and information about position location data, including position signals, and base station position location signals that includes position location data. The components may include a data processor 60 and a storage medium 62, coupled by a bus 64. The storage medium 62 is a machine- or computer-readable medium and may include but is not limited to volatile memories such as DRAM, and SRAM, as well as non-volatile memories such as ROM, FLASH, EPROM, EEPROM, and bubble memory.

Also capable of being connected to the bus are optional secondary storage 66, external storage 68, output devices such as a monitor 70 that may be included with the location server 26, and, in optional configurations, an input device such as a keyboard 72, a mouse 74, and a printer 76. The optional secondary storage 66 may include machine-readable media such as, but not limited to, a hard disk drive, a magnetic drum, and a bubble memory. The external storage 68 may include machine-readable media such as a floppy disk, a removable hard drive, a magnetic tape, CD-ROM, removable memory cards, and even other computers connected via a communications line. The distinction between the optional secondary storage 66 and the external storage 68 is primarily for convenience in describing the use of machine-readable memory. As such, a person skilled in the art will appreciate that there is substantial functional overlap between and among the components. Computer software and user programs can be stored in the storage medium 62 and external storage 68. Executable versions of computer software can be read from the storage medium 62 or other non-volatile storage medium, loaded for execution directly into volatile storage medium, executed directly out of non-volatile storage medium, or stored on the secondary storage prior to loading into volatile storage medium for execution.

The computer processing system 58 of the location server 26 includes a set of computer instructions (in this document, "instructions") for implementing the methods of the location related data transfer system 10 described in this document. The instructions 78 may be stored in various internal memory or may be implemented in hardware. The instructions may also be included in a computer processing system of a computer located external to the location server 26, for example, on a secured intranet, on the Internet, or at a base station, from which they may be transmitted to location server 26.

According to one aspect of the present disclosure, a target device (such as the mobile device 16 of FIG. 1) may obtain information associated with a relative change in location from a first time in the past when its location was accurately known to a second time in the future when its location again should be obtained.

Additionally, devices other than the target device may have use for the location of the target device. For example, a location server 26 may deliver location information to an external client, which may then use the location of the mobile device 16. The location server 26 may obtain the location of the mobile device 16 using position methods such as those supported by LPP and LPPe. For example, the location server 26 may use LPP and LPPe to instruct the mobile device 16 to obtain location measurements. In one example, the mobile device 16 obtains location measurements by measuring signals from a GPS satellite or LTE eNodeB(s) (i.e., base station(s)). The obtained location measurements are sent to the location server 26 to compute the location of the mobile device 16 from these measurements.

If the mobile device 16 is unable to obtain the location measurements, or unable to obtain accurate measurements within a predetermined response time, the location server 26 may be unable to compute the location of the mobile device 16. The location server 26 may still obtain the location of the mobile device 16 if the mobile device 16 sends the location server 26 the mobile device's relative change in location since the last time the mobile device's location was accurately obtained. In particular, the mobile device 16 may obtain its relative change in location between a first instant in time and a second instant in time by measurements obtained from the sensor(s) 17. The measurements from the sensor(s) 17 can be used by the mobile device 16 to determine the relative change in location from a first instant occurring at time T1 and a second instant occurring at time T2. Such relative position information can be delivered to the location server 26 in accordance with LPP and LPPe in a new message format.

As the mobile device 16 may not know when its location was last obtained accurately by location server 26, the mobile device 16 may measure its relative change in location following a number of time instants, T1, T2, T3, etc., during which the mobile device 16 attempted but possibly failed to obtain either its absolute location or measurements of base stations, GPS satellites, and/or other external signal sources that would enable location server 26 to obtain the absolute location of mobile device 16. In the case of LPP and LPPe, each of the time instants may correspond to sending an LPP location information message(s) from the mobile device 16 to the location server 26 containing information that may allow the location server 26 to obtain the accurate mobile device 16 location. The location server 26 may then request the relative changes in location from the mobile device 16. In one example, the relative changes in location are sent by the mobile device 16 to the location server 26 in an LPPe message embedded in an LPP Provide Location Information message. If the most recent accurate location for the mobile device 16 was obtained by the location server 26 at time T, then the location server 26 may use the relative change in location since time T to obtain the current location of the mobile device 16.

The change in location information may be transmitted in various ways. For example, in one aspect, the mobile device 16 can send a sequence of changes in location starting at some time $T(n)$ in the past and continuing over successive times $T(n-1)$, $T(n-2)$ until the present time $T(0)$. The changes in location may then comprise the change in location of the mobile device from time $T(n)$ to $T(n-1)$, from time $T(n-1)$ to $T(n-2)$, and so on up to the change from time $T(1)$ to $T(0)$. Each of the time instants $T(n)$, $T(n-1)$, $T(n-2)$, and $T(0)$ may correspond to a time when the mobile device 16 attempted to obtain its location and/or measurements that would enable the location server 26 to obtain the location of the mobile device 16 and at which such a location or measurements were sent to the location server 26 by the mobile device 16. If the mobile device 16 also includes the various changes in location between these successive times in the message it sends to the location server 26 at time $T(0)$, then the location server 26 can sum the successive changes in location to obtain the overall change of location of the mobile device 16 from time $T(n)$ in the past to the current time $T(0)$. If the location server 26 had received or been able to calculate an accurate location for the mobile device 16 at time $T(n)$ but not at later times, then the location server 26 can obtain an accurate location for the mobile device 16 at the current time $T(0)$ by adding the overall change in location of the mobile device 16 from time $T(n)$ to time $T(0)$ to the accurate location for the mobile device 16 obtained for time $T(n)$. For example, in a limiting case where $n=1$, the mobile device 16 would just send at the current time $T(0)$ its change in location from the last time $T(1)$ that it sent to the location server 26 an accurate location estimate or measurements enabling calculation of an accurate location estimate. The location server 26 would then just combine this change in location with the previously obtained accurate location of the mobile device 16 at time $T(1)$ to obtain an accurate location for the mobile device 16 at the current time $T(0)$.

In another configuration, the mobile device 16 may send a sequence of relative changes in its location where each change is measured from one of a preceding set of time instants $T(1)$, $T(2)$, $T(3)$ etc., to the current time $T(0)$. In this case, the relative changes in location would overlap but the location server 26 simply can select one of the received relative changes in location to apply to some preceding absolute location estimate.

Alternatively, in another aspect, the mobile device 16 sends its changes in location each time it obtains such a change. For example, the mobile device 16 may obtain its change in location starting at each instant $T(i)$ when the mobile device 16 sends its absolute location or location measurements to the location server 26 and ending at the next instant $T(i-1)$ when another attempt is made to obtain its absolute location or location measurements. Regardless of whether the mobile device 16 succeeds in obtaining its absolute location or location measurements, mobile device 16 may send this change in location to location server 26 at that time instant $T(i-1)$. The location server 26 then receives the relative changes in location from the mobile device 16 in real time (and not after some interval has elapsed) and synchronizes the information to time instants when the location server 26 had obtained or received the mobile device's absolute location.

Figure 3:
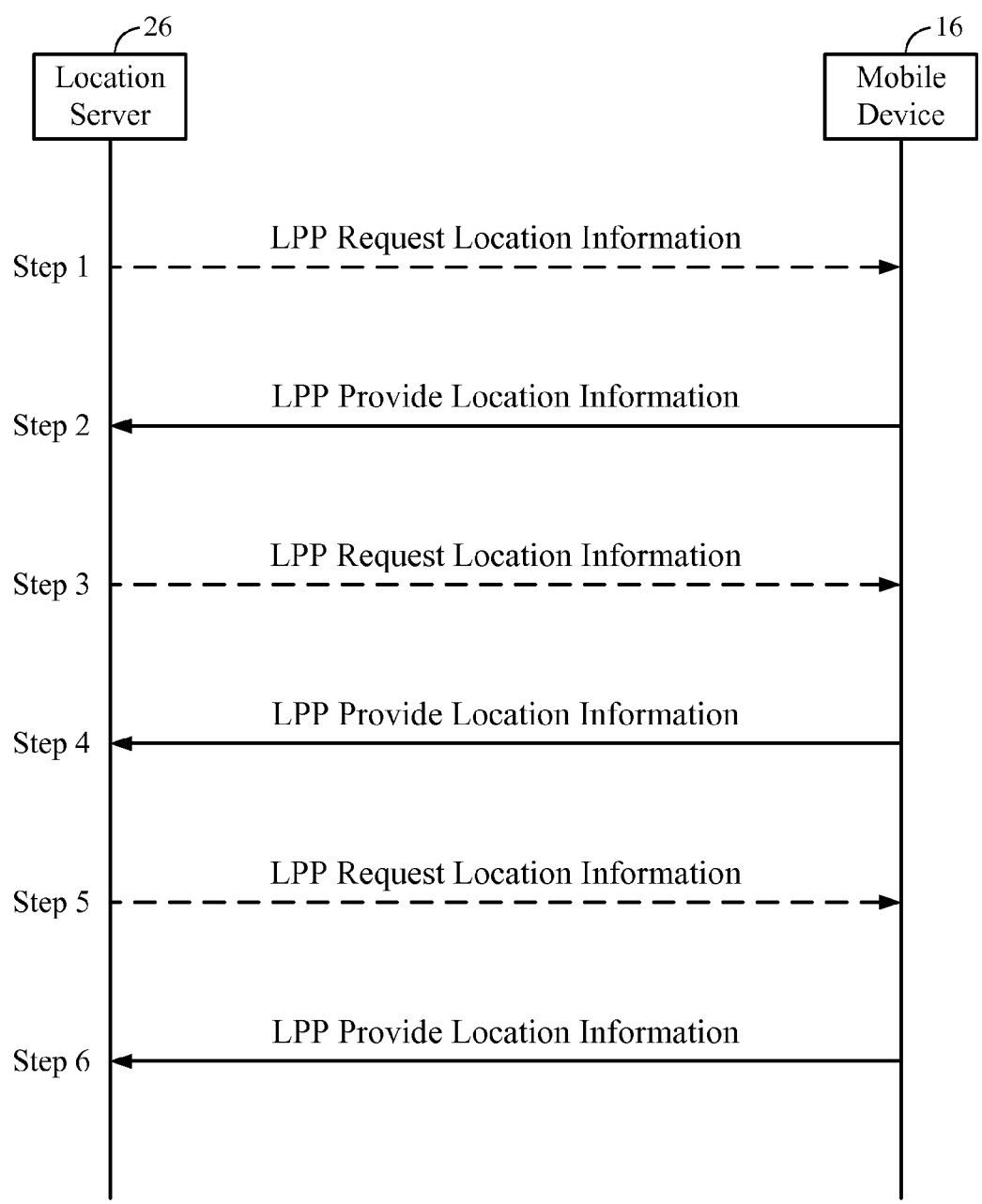
FIG. 3 illustrates an exemplary message transfer applicable to LPP and LPPe between a mobile device and location server for supporting location of a mobile device using relative change of location.

FIG. 3 shows an example of a message transfer applicable to LPP and LPPe between the mobile device 16 and the location server 26 for supporting the location of the mobile device 16 using relative change of location. In step 1, the location server 26 optionally sends an LPP Request Location Information message to the mobile device 16 containing a transaction ID TID(n) and a request for certain location information (e.g., location measurements and/or a location estimate for mobile device 16). In step 2, either in response to step 1, if step 1 occurs, or based on some other criterion, the mobile device 16 sends an LPP Provide Location Information message to the location server 26 at a time T(n). The message contains location measurements and/or a location estimate for the mobile device 16 which would be either those requested in step 1, if step 1 occurs, or those decided by the mobile device 16 according some other criteria otherwise. The message also contains a transaction ID TID(n) which is either the same as that in step 1, if step 1 occurs, or an ID decided according to other criteria by mobile device 16. The mobile device 16 may send other LPP Provide Location Information messages (not shown in FIG. 3) as part of step 2 at almost the same time containing additional location information. Steps 1 and 2 may be repeated at later times to enable the location server 26 to optionally request or the mobile device 16 to unilaterally provide further location measurements and/or location estimates. The subsequent repetitions of step 2 occur at times T(n−1), T(n−2) up to T(2) and include transaction IDs in place of TID(n) that are TID(n−1) in the repetition at time T(n−1), TID(n−2) in the repetition at T(n−2) up to TID(2) in the repetition at time T(2). The mobile device 16 also measures and stores its relative change of location between successive instances of step 2, i.e., from time T(n) to T(n−1), from time T(n−1) to time T(n−2) up to from time T(3) to time T(2).

Alternatively, the mobile device 16 may store data obtained from one or more sensors (e.g., sensor(s) 17 in FIG. 2A) that will enable these relative changes of location to be obtained at a later time. In step 3, the location server 26 optionally sends an LPP Request Location Information message to the mobile device 16 containing a transaction ID TID(1) and a request for certain location information (e.g., location measurements and/or a location estimate for mobile device 16). In step 4 either in response to step 3 if step 3 occurs or based on other criteria, the mobile device 16 sends an LPP Provide Location Information message to the location server 26 at a time T(1). The message contains location measurements and/or a location estimate which could be either those requested in step 3, if step 3 occurs, or those decided by the mobile device 16 according to other criteria otherwise. The message also contains a transaction ID TID(1) which is either the same as that in step 3 if step 3 occurs or an ID decided by the mobile device 16 according to other criteria. The mobile device 16 may send other LPP Provide Location Information messages (not shown in FIG. 3) as part of step 4 at almost the same time containing additional location information. The mobile device 16 also measures and stores its relative change of location between the last repetition of step 2 at time T(2) to the occurrence of step 4 at time T(1).

Alternatively, the mobile device 16 may store data obtained from one or more sensors (e.g., sensor(s) 17 in FIG. 2A) that will enable this relative change of location to be obtained at a later time. In step 5, the location server 26 optionally sends an LPP Request Location Information message to the mobile device 16 containing a transaction ID TID(0) and a request for mobile device 16 to send its most recent relative changes in location. The location server 26 may determine that mobile device 16 supports provision of relative changes in location from capability information (e.g. LPPe capability information) sent earlier from the mobile device 16 to location server 26. The location server 26 may also indicate the number of changes in relative location that the mobile device 16 should return to the location server 26 which, in this example, is n. These relative changes in location may be contiguous—with each successive change in location being measured from the location of mobile device 16 at which the previous change of location terminated. Immediately prior to step 6, which occurs at time T(0), mobile device 16 measures and stores its relative change of location between step 4 at time T(1) to the current time T(0). In step 6 which occurs at time T(0), mobile device sends an LPP Provide Location Information message to location server 26 containing location measurements and/or a location estimate and a transaction ID TID(0) that is the same as that used in step 5 if step 5 occurred. The mobile device 16 also includes the following information (which was either obtained and stored at times T(n−1), T(n−2) up to T(0) or can be determined from sensor data stored at these times) in the message in step 6 concerning it relative changes in location:

1. Relative change in location of the mobile device 16 from time T(1) to T(0), transaction ID TID(1) used at time T(1) in step 4, the time difference T(0)-T(1);

2. Relative change in location of the mobile device 16 from time T(2) to T(1), transaction ID TID(2) used in the last repetition of step 2 at time T(2), the time difference T(1)-T(2);

3. Relative changes in location of the mobile device 16 (together with associated transactions IDs and time differences) corresponding to that defined in (2) for relative change starting at each previous repetition of step 2 at times T(3), T(4) up to T(n−1) and associated with transaction IDs TID(3), TID(4), to TID(n−1); and 4. Relative change in location of the mobile device 16 from time T(n) to T(n−1), transaction ID TID(n) used at time T(n) in the first occurrence of step 2, the time difference T(n−1)-T(n).

The above information consists of n sets of relative location information corresponding to the n relative changes of location requested by the location server 26 in step 5 if step 5 occurred. Each set of relative location information comprises the change in location of the mobile device 16 from a time T(i) to a time T(i−1), the transaction ID TID(i) included by the mobile device 16 in the LPP Provide Location Information sent at time T(i) and the time difference between T(i) and T(i−1). The location server 26 can thus associate each set of relative location information with each LPP Provide Location Information received in FIG. 3—e.g. can use the transaction IDs and/or time differences between receipt of each message to help identify the messages. The location server 26 can sum the relative changes in location received in step 6 to obtain the overall change in location of the mobile device 16 since time T(n) which is associated with the message received in the first occurrence of step 2. If the location server 26 was able to obtain the absolute location of the mobile device at time T(n) using the location information received in the first occurrence of step 2 but was not able to obtain the absolute location of mobile device 16 following receipt of the location information at any subsequent time T(n−1), T(n−2) up to T(0), then the location server 26 may combine the overall change in location of the mobile device 16 since time T(n) with the absolute location of mobile device obtained for time T(n) to obtain the absolute location of mobile device 16 at time T(0). If the location server 26 was able to obtain the absolute location of the mobile device 16 at some later time T(i), then the location server 26 may instead sum the relative changes in location of the mobile device 16 received in step 6 for times succeeding T(i) and combine this sum with the absolute location obtained for time T(i) to obtain the absolute location of mobile device 16 for time T(0).

If the location server 26 was able to obtain the absolute location of mobile device 16 at both preceding times and the current time (e.g. at times T(n), T(n−1), up to (T0) in FIG. 3), the location server 26 can still improve the accuracy of the current location by using both the absolute locations obtained at the previous times and the relative changes in location between these times. Such information can be combined by filtering, for example, with a Kalman filter, to predict the current location from the most recent last location and change in the most recent location, as well as from the previous location estimates and previous changes in location. In this case, changes in location are not used to obtain an absolute location from a previous absolute location (e.g., as described in FIG. 3) but are instead used to improve the accuracy of an already available series of absolute locations. Changes in location may then be sent by the mobile device 16 to the location server 26 as each one is obtained along with any location measurements or absolute location estimate. Alternatively, the mobile device 16 may send a series of relative changes in location to the location server 26 in a single message (e.g., if requested by location server 26 or as exemplified in FIG. 3). In another aspect, the mobile device 16 may also indicate the possible error or uncertainty in the change in location by providing the standard deviation of the relative change in location (e.g., standard deviations of the changes of latitude, longitude, and altitude). The uncertainty could be expressed as a circle with a certain radius or as an ellipse with a certain semi major axis, semi minor axis, and offset angle. In this case, the center of the circle or ellipse would represent a location estimate for the mobile device 16 determined by the initial absolute location of the mobile device 16 combined with the provided relative change of location and the area enclosed by the circle or ellipse would define possible values of the real location of the mobile device 16 after its location had changed. The confidence of the uncertainty could also be provided (e.g. as a percentage) indicating the likelihood that the actual change in location lies within the circle or ellipse.

In another aspect, the location server 26 determines the location of the mobile device 16 using network measurements rather than terminal measurements. In this aspect, the location server 26 can request the mobile device 16 to provide its change in location since a particular previous time or over very small time intervals since a particular previous time period. The location server 26 can then combine the change or changes of location provided by the mobile device 16 with the absolute location or locations of the mobile device 16 obtained by location server 26 from the network measurements to obtain the absolute location of the mobile device 16 at a later time when network measurements are insufficient to determine this. The location server 26 can also use the relative changes in location to improve the accuracy of an already obtained absolute location (obtained from network measurements) as described previously for the case where absolute location is provided by the mobile device 16 or determined from measurements provided by the mobile device 16.

In a further aspect, relative changes in location received from the mobile device 16 by the location server 26 may be used to obtain, improve the accuracy of, or verify the absolute location of the mobile device 16 when the location server 26 employs hybrid positioning methods making use of measurements or location estimates from both the mobile device 16 and from elements (e.g., base stations) in one or more networks.

Figure 4:
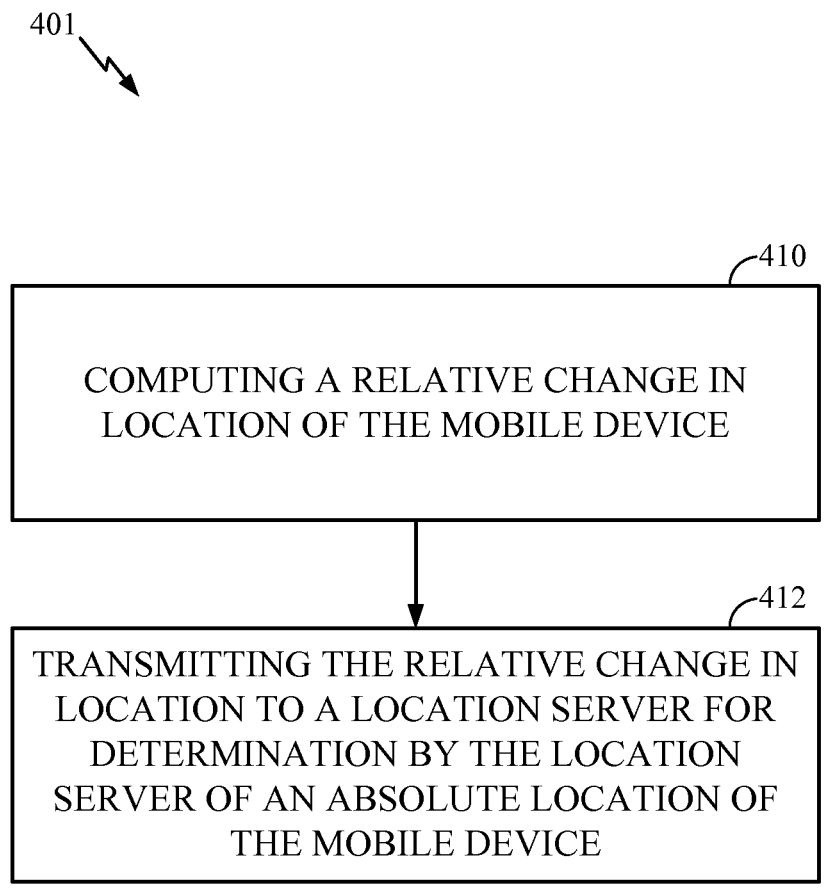
FIG. 4 is a block diagram illustrating a method of determining the location of a mobile device based on relative change in location information sent from a target device to a location server.

FIG. 4 illustrates a method 401 for obtaining the location of a mobile device 16. In block 410, a relative change in location of a mobile device is computed using local sensor(s) 17 of the mobile device 16. In block 412, the relative change in location is transmitted to the location server 26 for determination by the location server of an absolute location of the mobile device.

Figure 5:
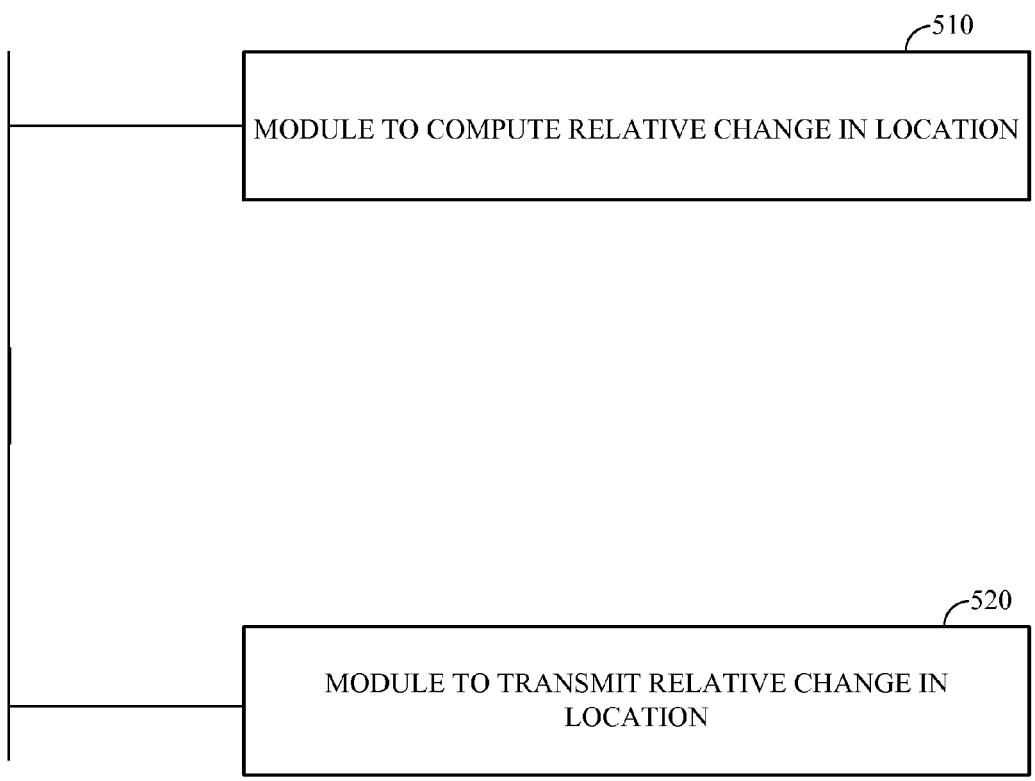
FIG. 5 is a block diagram illustrating components for determining the location of a mobile device based on relative change in location information sent from a target device to a location server.

FIG. 5 shows a block diagram of an apparatus for a mobile device 16. The apparatus includes a module or block 510 for computing a relative change in location of the mobile device using the local sensor(s) 17 of the mobile device 16. The apparatus also includes a module or block 520 for transmitting the relative change in location to a location server for estimating, by the location server, an absolute location of the mobile device. The modules or blocks in FIG. 5 may be processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methodologies described herein may be implemented by various means depending upon the application. For example, these methodologies may be implemented in hardware, firmware, software, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine or computer readable medium tangibly embodying instructions may be used in implementing the methodologies described herein. For example, software code may be stored in a memory and executed by a processor. When executed by the processor, the executing software code generates the operational environment that implements the various methodologies and functionalities of the different aspects of the teachings presented herein. Memory may be implemented within the processor or external to the processor. As used herein the term "memory" refers to any type of long term, short term, volatile, nonvolatile, or other memory and is not to be limited to any particular type of memory or number of memories, or type of media upon which memory is stored.

The machine- or computer-readable medium that stores the software code defining the methodologies and functions described herein includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. As used herein, disk and/or disc includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. Although the communication apparatus may not store all of the instructions and/or data on a computer readable medium.

The disclosure may be implemented in conjunction with Wi-Fi/WLAN or other wireless networks. In addition to Wi-Fi/WLAN signals, a wireless/mobile station may also receive signals from satellites, which may be from a Global Positioning System (GPS), Galileo, GLONASS, NAVSTAR, QZSS, a system that uses satellites from a combination of these systems, or any SPS developed in the future, each referred to generally herein as a Satellite Positioning System (SPS) or GNSS (Global Navigation Satellite System). The disclosure may also be implemented in conjunction with pseudolites or a combination of systems that includes pseudolites. The disclosure may also be implemented in conjunction with femtocells or a combination of systems that includes femtocells.

Position determination techniques described herein may be implemented in conjunction with various wireless communication networks such as a wireless wide area network (WWAN), a wireless local area network (WLAN), a wireless personal area network (WPAN), and so on. The term "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a Long Term Evolution (LTE) network, a WiMAX (IEEE 802.16) network, and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be implemented in conjunction with any combination of WWAN, WLAN, and/or WPAN.

Although the preceding description was primarily with respect to GPS, the method and apparatus described herein may be used with various global satellite positioning systems (SPS). A satellite positioning system (SPS) typically includes a system of transmitters positioned to enable entities to determine their location on or above the Earth based, at least in part, on signals received from the transmitters. Such a transmitter typically transmits a signal marked with a repeating pseudo-random noise (PN) code of a set number of chips and may be located on ground based control stations, user equipment and/or space vehicles. In a particular example, such transmitters may be located on Earth orbiting satellite vehicles (SVs). For example, a SV in a constellation of Global Navigation Satellite System (GNSS) such as Global Positioning System (GPS), Galileo, Glonass, or Compass may transmit a signal marked with a PN code that is distinguishable from PN codes transmitted by other SVs in the constellation (e.g., using different PN codes for each satellite as in GPS or using the same code on different frequencies as in Glonass). In accordance with certain aspects, the techniques presented herein are not restricted to global systems (e.g., GNSS) for SPS. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, Beidou over China, etc., and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global navigation satellite systems, regional navigation satellite systems, and/or augmentation systems, and SPS signals may include SPS, SPS-like, and/or other signals associated with such one or more SPS.

The methodologies may be used with positioning determination systems that utilize pseudolites or a combination of satellites and pseudolites. Pseudolites are ground-based transmitters that broadcast a PN code or other ranging code (similar to a GPS or CDMA cellular signal) modulated on an L-band (or other frequency) carrier signal, which may be synchronized with GPS time. Each such transmitter may be assigned a unique PN code so as to permit identification by a remote receiver. Pseudolites are useful in situations where signals from an orbiting satellite might be unavailable, such as in tunnels, mines, buildings, urban canyons or other enclosed areas. Another implementation of pseudolites is known as radio-beacons. The term "satellite", as used herein, is intended to include pseudolites, equivalents of pseudolites, and similar devices. The term "SPS signals," as used herein, is intended to include SPS-like signals from pseudolites or equivalents of pseudolites.

As used within the disclosure, a mobile device refers to a device such as a cellular or other wireless communication device, personal communication system (PCS) device, personal navigation device (PND), personal information manager (PIM), personal digital assistant (PDA), laptop, tablet or other suitable mobile station device which is capable of receiving wireless communication and/or navigation signals. The term "mobile device" is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, "mobile device" is intended to include all devices, including wireless communication devices, computers, laptops, etc. which are capable of communication with a server, such as via the Internet, WiFi, or other networks, and regardless of whether satellite signal reception, assistance reception, and/or position-related processing occurs at the device, at a server, or at another device associated with the network. Any operable combination of the above are also considered a "mobile device."

This disclosure includes example embodiments; however, other implementations can be used. Designation that something is "optimized," "required" or other designation does not indicate that the current disclosure applies only to systems that are optimized, or systems in which the "required" elements are present (or other limitation due to other designations). These designations refer only to the particular described implementation. Of course, many implementations are possible. The techniques can be used with protocols other than those discussed herein, including protocols that are in development or to be developed.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for obtaining a location of a mobile device, the method comprising:
   computing, by the mobile device, a relative change in location of the mobile device using local sensors of the mobile device;
   transmitting, by the mobile device and in accordance with Long Term Evolution (LTE) Positioning Protocol Extensions (LPPe) protocol, the relative change in location to a location server for estimating, by the location server, an absolute location of the mobile device; and
   transmitting, by the mobile device and in accordance with LPPe protocol, at least one error estimate of the relative change in location to the location server.

2. The method of claim 1, further comprising transmitting previous relative location information of the mobile device to the location server in a same message including current relative change information.

3. The method of claim 1, further comprising receiving a request from the location server to provide the relative change in location since a particular previous time.

4. The method of claim 1, further comprising receiving a request from the location server to periodically provide the relative change in location at particular time intervals.

5. An apparatus for wireless communication, comprising:
   means for computing a relative change in location of a mobile device using local sensors of the mobile device;
   means for transmitting, in accordance with LPPe protocol, the relative change in location to a location server for estimating, by the location server, an absolute location of the mobile device; and
   means for transmitting, in accordance with LPPe protocol, at least one error estimate of the relative change in location to the location server.

6. The apparatus of claim 5, further comprising means for transmitting previous relative location information of the mobile device to the location server in a same message including current relative change information.

7. The apparatus of claim 5, further comprising means for receiving a request from the location server to provide the relative change in location since a particular previous time.

8. The apparatus of claim 5, further comprising means for receiving a request from the location server to periodically provide the relative change in location at particular time intervals.

9. A computer program product for wireless communication in a wireless network, comprising:
   a non-transitory computer-readable medium having non-transitory program code recorded thereon, the program code comprising:
   program code to compute a relative change in location of a mobile device using local sensors of the mobile device;
   program code to transmit, in accordance with LPPe protocol, the relative change in location to a location server for estimating, by the location server, an absolute location of the mobile device; and
   program code to transmit, in accordance with LPPe protocol, at least one error estimate of the relative change in location to the location server.

10. The computer program product of claim 9, further comprising program code to transmit previous relative location information of the mobile device to the location server in a same message including current relative change information.

11. The computer program product of claim 9, further comprising program code to receive a request from the location server to provide the relative change in location since a particular previous time.

12. The computer program product of claim 9, further comprising program code to receive a request from the location server to periodically provide the relative change in location at particular time intervals.

13. An apparatus for wireless communication, comprising:
   a memory; and
   at least one processor coupled to the memory, the at least one processor being configured to:
   compute a relative change in location of a mobile device using local sensors of the mobile device; and
   transmit, in accordance with LPPe protocol, the relative change in location to a location server for estimating, by the location server, an absolute location of the mobile device; and
   transmit, in accordance with LPPe protocol, at least one error estimate of the relative change in location to the location server.

14. The apparatus of claim 13, in which the at least one processor is further configured to transmit previous relative location information of the mobile device to the location server in a same message including current relative change information.

15. The apparatus of claim 13, in which the at least one processor is further configured to receive a request from the location server to provide the relative change in location since a particular previous time.

16. The apparatus of claim 13, in which the at least one processor is further configured to receive a request from the location server to periodically provide the relative change in location at particular time intervals.

17. A method for obtaining a location of a mobile device, the method comprising:
   computing, by the mobile device, a relative change in location of the mobile device using local sensors of the mobile device;
   receiving, at the mobile device, a request from a location server to provide the relative change in location since a particular previous time; and
   transmitting, by the mobile device and in accordance with LPPe protocol, the relative change in location to the location server for estimating, by the location server, an absolute location of the mobile device.

18. The method of claim 17, further comprising transmitting previous relative location information of the mobile device to the location server in a same message including current relative change information.

19. The method of claim 17, further comprising receiving a request from the location server to periodically provide the relative change in location at particular time intervals.

20. The method of claim 17, further comprising transmitting at least one error estimate of the relative change in location.

21. An apparatus for wireless communication, comprising:
   means for computing a relative change in location of a mobile device using local sensors of the mobile device;
   means for receiving a request from a location server to provide the relative change in location since a particular previous time; and
   means for transmitting, in accordance with LPPe protocol, the relative change in location to the location server for estimating, by the location server, an absolute location of the mobile device.

22. The apparatus of claim 21, further comprising means for transmitting previous relative location information of the mobile device to the location server in a same message including current relative change information.

23. The apparatus of claim 21, further comprising means for receiving a request from the location server to periodically provide the relative change in location at particular time intervals.

24. The apparatus of claim 21, further comprising means for transmitting at least one error estimate of the relative change in location.

25. A non-transitory computer-readable storage medium for wireless communication in a wireless network, comprising:
   a computer-readable medium having non-transitory program code recorded thereon, the program code comprising:
   program code to compute, by a mobile device, a relative change in location of the mobile device using local sensors of the mobile device;
   program code to receive a request from a location server to provide the relative change in location since a particular previous time; and
   program code to transmit, in accordance with LPPe protocol, the relative change in location to the location server for estimating, by the location server, an absolute location of the mobile device.

26. The non-transitory computer-readable storage medium of claim 25, further comprising program code to transmit previous relative location information of the mobile device to the location server in a same message including current relative change information.

27. The non-transitory computer-readable storage medium of claim 25, further comprising program code to receive a request from the location server to periodically provide the relative change in location at particular time intervals.

28. The non-transitory computer-readable storage medium of claim 25, further comprising program code to transmit at least one error estimate of the relative change in location.

29. An apparatus for wireless communication, comprising:
   a memory; and
   at least one processor coupled to the memory, the at least one processor being configured to:
   compute a relative change in location of a mobile device using local sensors of the mobile device;
   receive a request from a location server to provide the relative change in location since a particular previous time; and
   transmit, and in accordance with LPPe protocol, the relative change in location to the location server for estimating, by the location server, an absolute location of the mobile device.

30. The apparatus of claim 29, in which the at least one processor is further configured to transmit previous relative location information of the mobile device to the location server in a same message including current relative change information.

31. The apparatus of claim 29, in which the at least one processor is further configured to receive a request from the location server to periodically provide the relative change in location at particular time intervals.

32. The apparatus of claim 29, in which the at least one processor is further configured to transmit at least one error estimate of the relative change in location.

* * * * *